United States Patent
Bergen et al.

(10) Patent No.: US 12,416,722 B2
(45) Date of Patent: Sep. 16, 2025

(54) METHODS AND SYSTEMS FOR VEHICLE-BASED TRACKING OF NEARBY EVENTS

(71) Applicant: Spartan Radar, Inc., Los Alamitos, CA (US)

(72) Inventors: Scott Bergen, New Canaan, CT (US); Tyler Rather, Redondo Beach, CA (US); Jennifer Carter, Arlington, VA (US); Morgan Brewster, Los Alamitos, CA (US)

(73) Assignee: Spartan Radar, Inc., Los Alamitos, CA (US)

( * ) Notice: Subject to any disclaimer, the term of this patent is extended or adjusted under 35 U.S.C. 154(b) by 308 days.

(21) Appl. No.: 18/198,249

(22) Filed: May 16, 2023

(65) Prior Publication Data

US 2023/0367006 A1 Nov. 16, 2023

Related U.S. Application Data (60) Provisional application No. 63/342,559, filed on May 16, 2022.

(51) Int. Cl.
*G01S 13/931* (2020.01)

(52) U.S. Cl.
CPC .................. *G01S 13/931* (2013.01)

(58) Field of Classification Search
None
See application file for complete search history.

(56) References Cited

U.S. PATENT DOCUMENTS

| 4,258,421 A | * | 3/1981 | Juhasz | G07C 5/085 |
| | | | | 701/33.9 |
| 4,533,962 A | * | 8/1985 | Decker | G07C 5/085 |
| | | | | 360/6 |

(Continued)

FOREIGN PATENT DOCUMENTS

WO WO2019/126874 A1 * 7/2019 ............. G06Q 10/20

OTHER PUBLICATIONS

"Who We Are: Our Brands"; no author given; published by the Wi-Fi Alliance; Austin, TX, USA; posted on the Internet at wi-fi.org; copyright in the year 2024. (Year: 2024).*

(Continued)

*Primary Examiner* — Bernarr E Gregory
(74) *Attorney, Agent, or Firm* — Nixon Peabody LLP (57) ABSTRACT

The present disclosure generally relates to methods, systems, apparatuses, and non-transitory computer readable media for incident detection using radar sensory data. A vehicular tracking system comprises at least one on-vehicle sensor, such as a radar sensor, that can perceive the environment around the vehicle and capture data related to possible incidents that may be viewed by the sensor. A radar sensor may provide radar data that can be used to calculate velocity vectors, accelerations vectors, azimuth and elevation angles of other vehicles, and this data may be collected and stored for possible incident characterization and accident investigation. The vehicle with the sensor may be configured to behave as a third-party witness to possible incidents. Several sensors may be used in conjunction with one another, where one sensor may trigger another sensor to begin capturing other data that the first sensor may be unable to capture.

17 Claims, 8 Drawing Sheets

(56) References Cited

U.S. PATENT DOCUMENTS

| | | | | |
|---|---|---|---|---|
| 4,638,289 | A * | 1/1987 | Zottnik | G07C 5/0825 |
| | | | | 340/436 |
| 4,804,937 | A * | 2/1989 | Barbiaux | G07C 5/008 |
| | | | | 340/459 |
| 5,305,216 | A * | 4/1994 | Okura | F02D 41/26 |
| | | | | 123/480 |
| 9,633,318 | B2 * | 4/2017 | Plante | G07C 5/085 |
| 11,922,734 | B1 * | 3/2024 | Kellett | G08G 1/205 |
| 11,934,988 | B1 * | 3/2024 | Fedorynski | G06Q 10/083 |
| 2007/0135980 | A1 * | 6/2007 | Plante | G07C 5/08 |
| | | | | 701/33.4 |
| 2014/0002651 | A1 * | 1/2014 | Plante | G07C 5/0866 |
| | | | | 348/148 |
| 2020/0027333 | A1 * | 1/2020 | Xu | G08G 1/164 |
| 2020/0166941 | A1 * | 5/2020 | Yu | G07C 5/008 |
| 2020/0175788 | A1 * | 6/2020 | Park | G07C 5/008 |
| 2020/0218729 | A1 * | 7/2020 | Ryu | G06F 16/29 |
| 2021/0065469 | A1 * | 3/2021 | Dutta | H04L 9/3239 |
| 2023/0098006 | A1 * | 3/2023 | Park | G07C 5/008 |
| | | | | 726/28 |

OTHER PUBLICATIONS

"Guidance for use of the LTE logo"; no author given; published by 3GPP Partners; Sophia Antipolis, France; posted on the Internet at www.3gpp.org; copyright in the year 2024. (Year: 2024).*

* cited by examiner

METHODS AND SYSTEMS FOR VEHICLE-BASED TRACKING OF NEARBY EVENTS

CROSS-REFERENCE TO RELATED APPLICATIONS

This application claims priority to U.S. Provisional Patent Application No. 63/342,559, filed on May 16, 2022, which is incorporated herein by reference in its entirety.

BACKGROUND

Technical Field

The present disclosure generally relates to vehicle-based tracking of nearby events, and more particularly, methods, systems, apparatuses, and non-transitory computer readable media for using a vehicle's sensor suite to detect and record nearby events of interest.

Description of the Background

Vehicular radar systems generally comprise sense and avoid techniques to sense any possible threats to a primary vehicle, i.e., the vehicle with the sense and avoid technology must be involved in a possible collision in some way. Radar sensors may be available for blind spot detection, lane change assistance, collision mitigation, rear cross traffic alerts etc. Radar sensors are typically used to provide assistance to the driver of the primary vehicle by generating alerts or warnings upon the detection of external threats. These systems help improve the safety on roads. However, accidents still take place on roads. Once an accident has occurred, however, those involved may try to shift blame onto another party. Techniques for accident recoding and reconstruction are desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The present disclosure generally relates to systems and methods for tracking vehicles, identifying when vehicular accidents occur, and capturing and preserving data indicative of the identified accidents. In some embodiments of the present disclosure, a vehicle (referred to hereafter as "primary vehicle") is equipped with at least one radar sensor that is configured to provide radar data indicative of objects within a proximity of the primary vehicle, such as other vehicles, referred to hereafter as "third-party vehicles," that may be traveling on a roadway. An exemplary radar sensor for detecting objects in a vicinity of a vehicle is described by commonly-assigned U.S. patent application Ser. No. 17/375,994, entitled "Methods and Systems for Processing Radar Signals" and filed on Jul. 14, 2021, which is incorporated herein by reference, now U.S. Pat. No. 11,740,328.

The radar data from the radar sensor may be used to help control the primary vehicle (e.g., a sense and avoid application in an autonomous vehicle) or to warn a driver of the primary vehicle about possible collision threats. The radar data may also be used to detect accidents between third party vehicles so that various actions may then be taken in response to the accident as will be described in more detail below.

In this regard, radar data can be used to determine various information about objects, such as third-party vehicles within a proximity of the primary vehicle. Specifically, in analyzing radar data, it is possible for a controller to detect an object, such as a third-party vehicle, and determine the object's range, azimuth, and elevation from the radar sensor. The controller also may determine acceleration and velocity vectors of the object. Using such information, including in particular the velocity and acceleration vectors, it is possible for the controller to determine the trajectory or track of the object in three-dimensional (3D) space.

Figure 1:
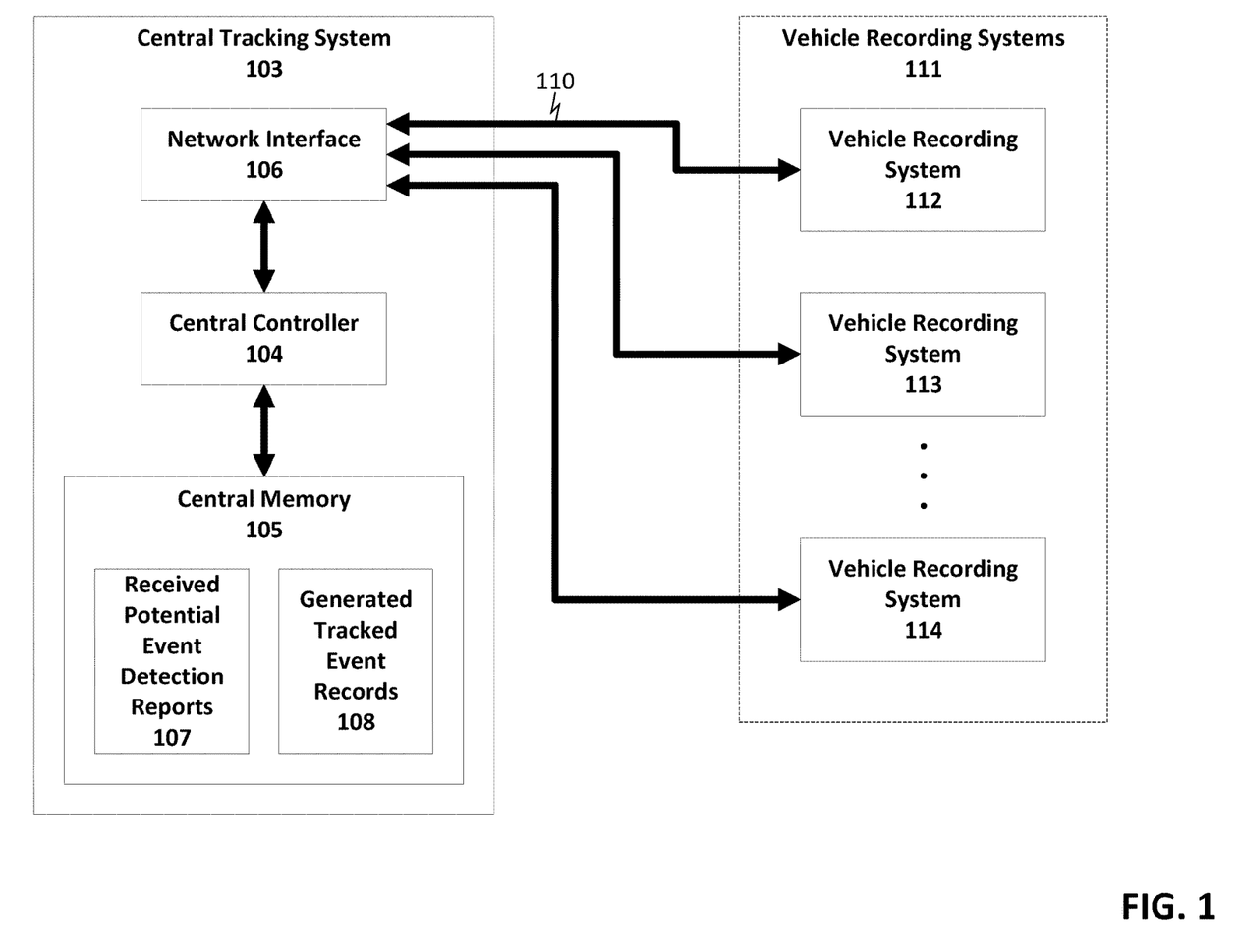
FIG. 1 is a block diagram of an exemplary event tracking system, in accordance with an exemplary embodiment of the present disclosure.

FIG. 1 shows a block diagram of an event tracking system 102, in accordance with an exemplary embodiment of the present disclosure. As shown by the figure, an event tracking system 102 may comprise a central controller 104, a central memory 105, and a network interface 106. The central controller 104 may be used to "manage" the event tracking system 102 and its various components as described in more detail below. Towards this end, the central controller 104 may be connected to the central memory 105, where various information, such as received potential event detection reports 107 or generated tracked event records 108, are stored (and accessible by the central controller 104 when needed).

Similarly, the central controller 104 may be connected to the network interface 106, which may be used to interact with and receive information from the fleet of vehicle recording systems 111, shown here as vehicle recording systems 112, 113, and 114. As is shown in FIG. 1, the network interface 106 may connect to one of the vehicle recording systems 111 over connections 110. This may involve communicating with the vehicle recording systems 111 through the network interface 106 (and thus through connections 110 and 111). In general, the connections 110 may utilize a variety of wired or wireless mediums (and may use multiple such mediums) to connect the network interface 106 to a particular vehicle recording system. Moreover, the technology used to connect the network interface 106 and the various vehicle recording system may vary between vehicle recording system. For example, it may include wireless transmission (e.g., LTE, Wi-Fi, etc.) as well as wired connections (e.g., Ethernet, fiber-optics, etc.).

As is explained in more detail below, the vehicle recoding systems 111 may act to monitor their environment to detect potential event indicators. Upon detecting a potential event indicator, a vehicle recording system may transmit a potential event detection report to the central tracking system 103. Among other things, the potential event detection report may include information about the detected potential event indicator and information about the local environment of the vehicle recording system.

Figure 2:
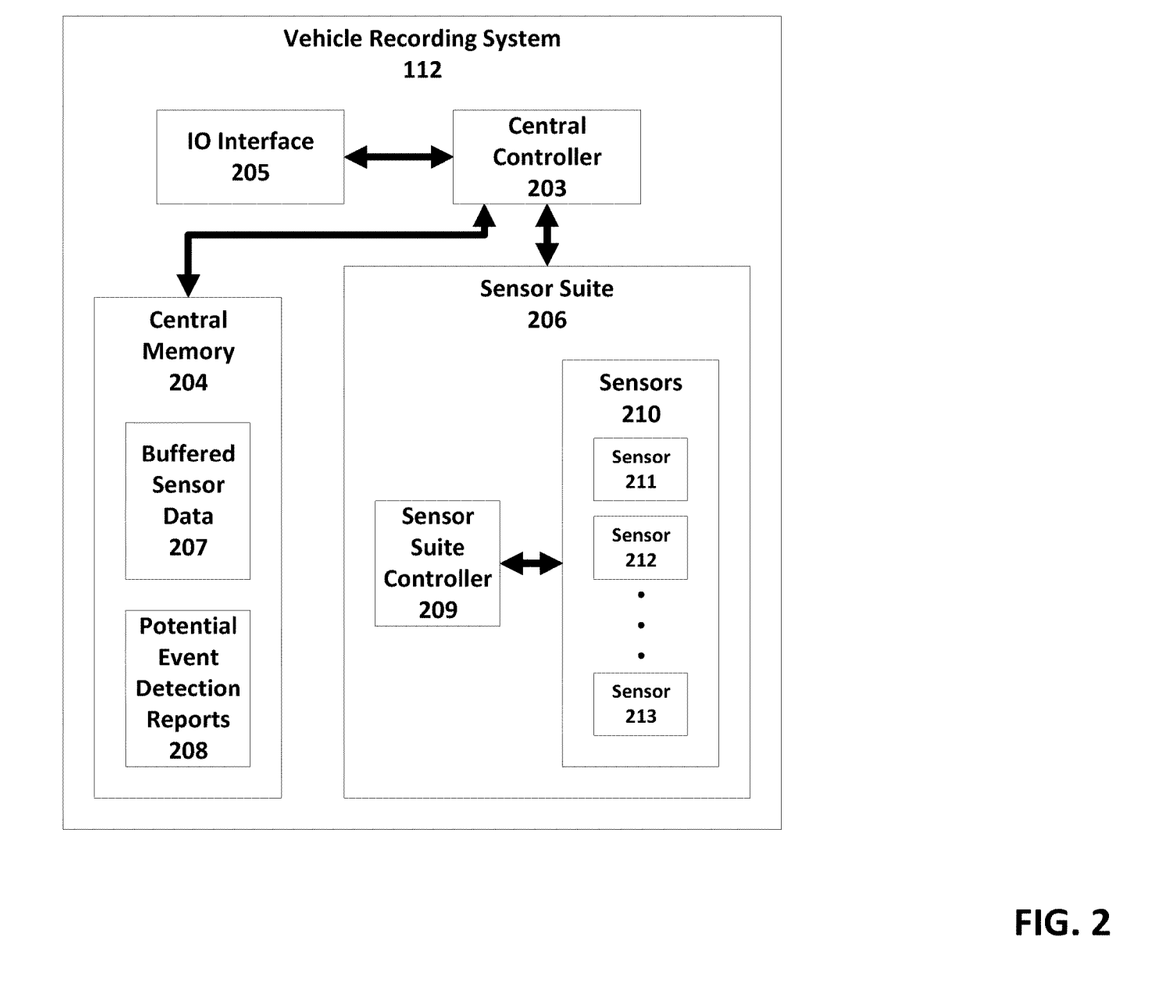
FIG. 2 is a block diagram of an exemplary vehicle recording system, such as the vehicle recording system of FIG. 1.

FIG. 2 is a block diagram of a vehicle recording system, shown here as vehicle recording system 112 of FIG. 1. As shown by the figure, a vehicle recording system 112 may comprise a central controller 203, a central memory 204, host system external input/output (I/O) interface 205, and the sensor suite 206. Broadly speaking, the central controller 203 may be used to "manage" the function and operation of the vehicle recording system 112. Towards this end, the central controller 203 may be connected to the central memory 204, where various information, such as buffered sensor data 207 or untransmitted potential event reports 208, are stored (and accessible by the central controller 203 when needed). Similarly, the central controller 203 may be connected to the host system external I/O interface 205, which may be used to interact with other devices, such as the central tracking system 103. The central controller 203 may also be connected to a sensor suite 206. The sensor suite 206 may comprise sensors 210, shown here as sensors 211, 212, and 213. The central controller 203 may use the sensor suite 206 to collect sensor data about the local environment of the vehicle recording system 112 on which the sensors 210 are located. In some embodiments, the sensor suite 206 may have a sensor suite controller 209 dedicated to managing the sensors 210. In other embodiments, the central controller 203 may perform the functions of the sensor suite controller 209 and directly manage the sensors 210.

The buffered sensor data 207 may be stored in the central memory 204 in a circular buffer. For example, a FIFO (First-In-First-Out) buffer will store only the exact number of bits that is allowed by the size of the buffer and any new data that comes in overwrites the old data one bit at the time, where the first bit that entered the buffer will be overwritten first. Other buffers may be used such is LIFO (Last-In-First-Out) depending on the need. Any radar data related to a vehicle, including the primary vehicle and third-party vehicles may be referred to as a track file (not shown).

The central controller 203 may be implemented in hardware or a combination of hardware and software. As an example, the central controller 203 may comprise one or more FPGAs or one or more ASICs. In some embodiments, the central controller 203 may comprise one or more processors (e.g., CPUs or microprocessors) programmed with software that when executed by the processor cause the processor to perform the functions described herein for the central controller 203. In other embodiments, other configurations of the central controller 203 are possible.

The host system external I/O interface 205 may comprise circuitry configured to communicate with other devices. As an example, the host system external I/O interface 205 may comprise modems, wireless radios (e.g., cellular transceivers), or other devices that are designed to communicate using peer-to-peer short-range wireless communication protocols, such as Bluetooth, Wi-Fi, NFC, UWB, IEEE 1902.15.4, or RFID. The host system external I/O interface 205 may also comprise modems, wireless radios (e.g., cellular transceivers), or other devices that are designed to communicate with network access points, such as cellular towers, network routers, Wi-Fi hots spots, or other types of access points.

In some embodiments, one or more of the sensors 210 may comprise a radar sensor. In general, a radar sensor may comprise an antenna array that is comprised of a transmitter array and a receiver array. The antenna array may be used to transmit radar signals and receive reflected echoes of those radar signals. In particular, the radar sensor may use the transmitter array to transmit various radar signal pulses (from each of the transmitter array's transmitter antennas) and use the receiver array to obtain (from each of the receiver array's receiver elements) measurements of the received echoes of those radar signal pulses. The radar sensor may utilize these measurements to detect and determine the relative position of nearby objects in view of the antenna array. Eventually, the radar sensor may send the position information to the sensor suite controller 209 (or, in some embodiments, the central controller 203), which may use the positioning information for various purposes (e.g., obstacle avoidance).

Figure 7A:
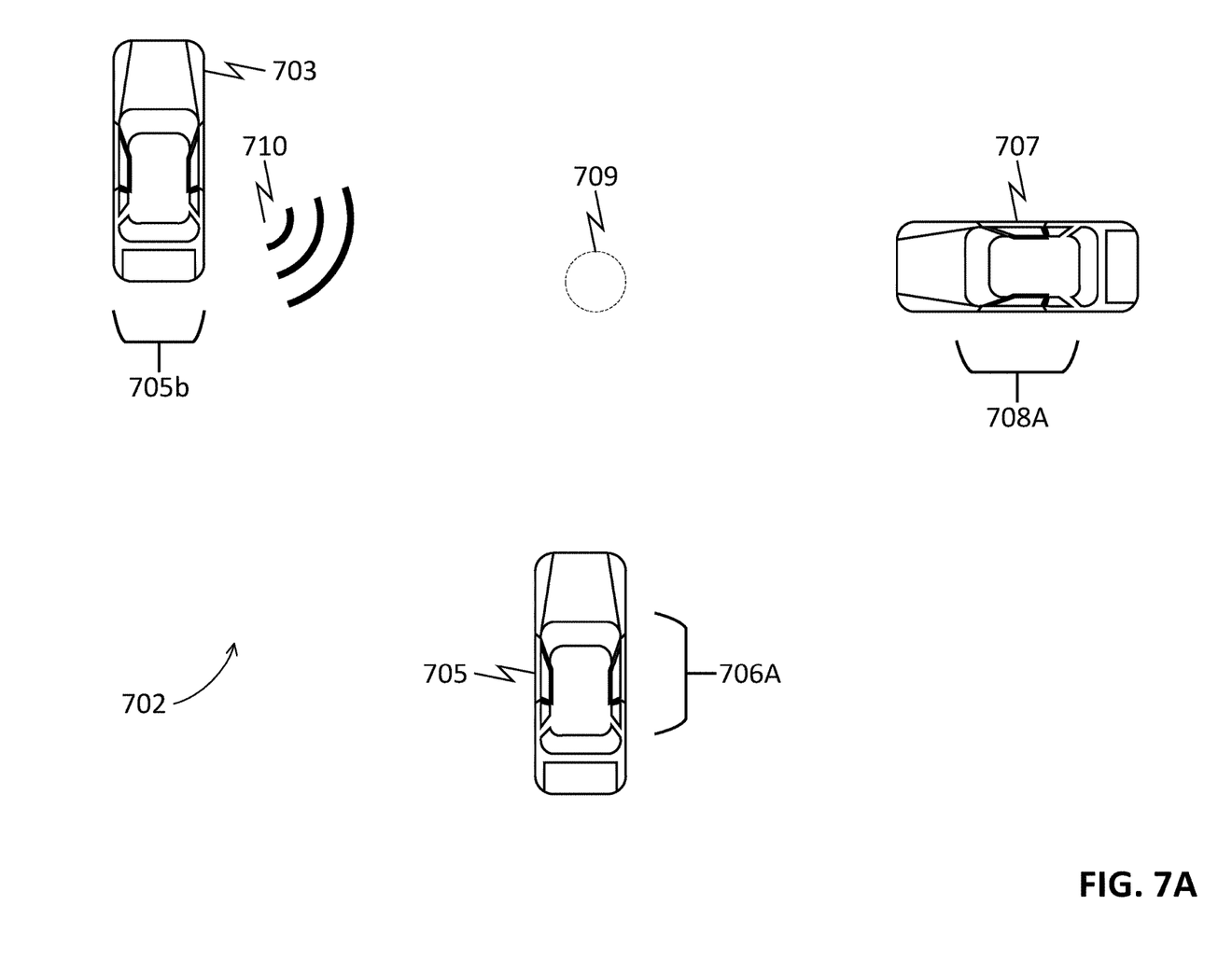
FIGS. 7A and 7B illustrations showing a traffic collision detected by a vehicle recording system, such as the vehicle recording system of FIG. 1. of an exemplary vehicular tracking system.
Figure 7B:
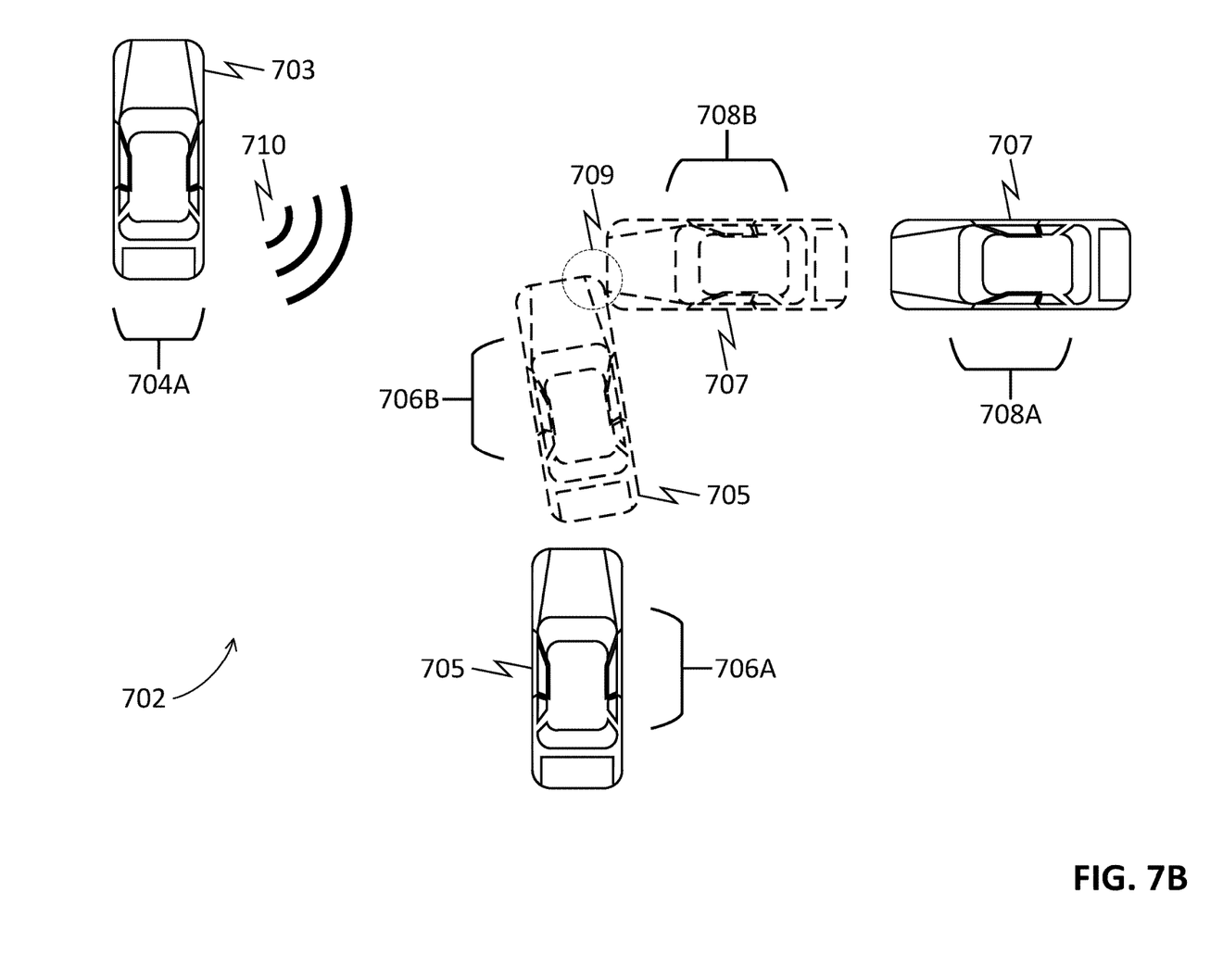

The radar data related to a given vehicle, referred to as a track file, may be stored and analyzed to assess the accident or collision at point 709 between the third-party vehicles 705 and 707.

Figure 3:
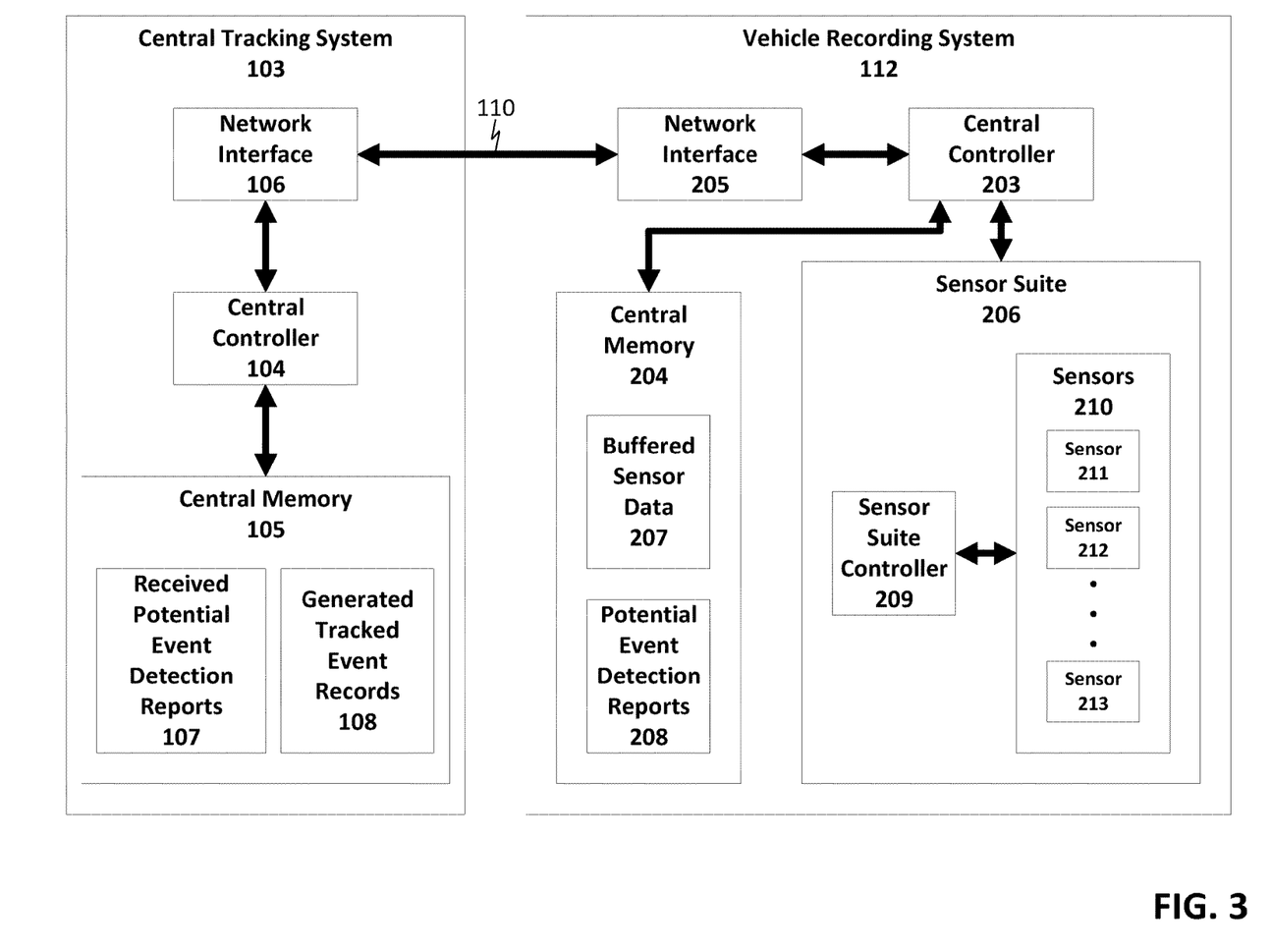
FIG. 3 is a block diagram of an exemplary central tracking system, such as the central tracking system of FIG. 1.

FIG. 3 is a block diagram showing the central tracking system 103 of FIG. 1 interacting with a single vehicle recording system.

Figure 4:
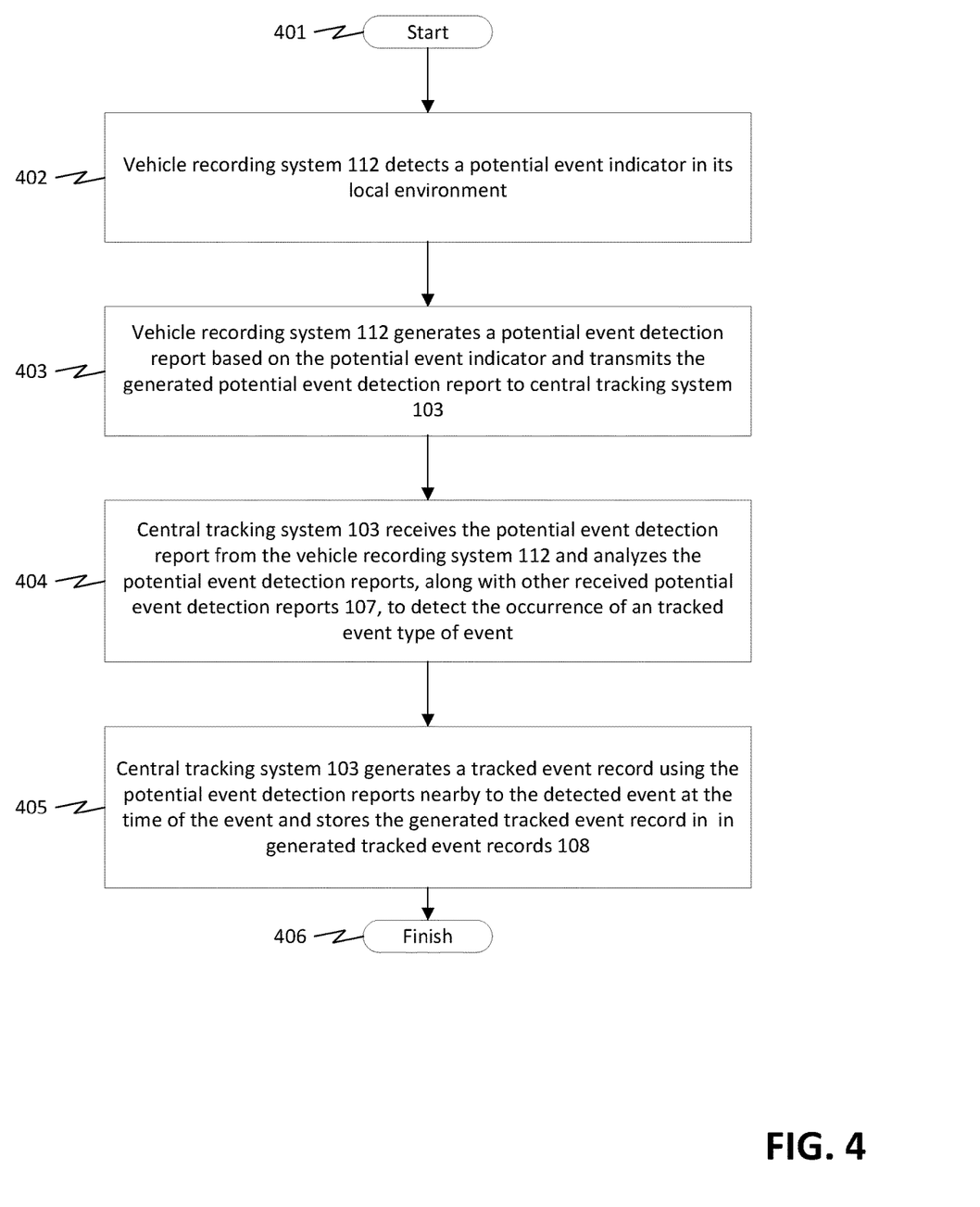
FIG. 4 is a flowchart illustrating a process of tracking events using an event tracking system, such as the event tracking system of FIG. 1.

FIG. 4 is a flowchart illustrating a process of tracking events using an event tracking system, such as the event tracking system of FIG. 1.

In some embodiments, a controller of the primary vehicle is configured to use radar data from the vehicle's radar sensor to detect and identify third-party vehicles within a proximity of the radar sensor and, thus, the primary vehicle on which the radar sensor is located. For each identified third-party vehicle, the controller is configured to determine its track, and based on tracks of multiple vehicles, the controller is configured to detect or predict an occurrence of an accident. For example, a track of a vehicle may be its movement from point A to point B, the speed associated with the movement, the rate of deceleration of the vehicle, direction of the movement etc. In this regard, two tracks converging to the same approximate location or point in 3D space may indicate an accident occurring at the location. The track of the vehicles after converging at the location may be further analyzed to confirm whether an accident did, in fact, occur. As an example, rapid deceleration of one or more of the vehicles at or near the location of convergence may indicate that one of the vehicles collided with the other vehicle. The radar sensor data may further provide assistance in fault determination in an accident, where the parties may not agree on how the accident occurred, which may be referred to herein as accident or incident reconstruction.

In this regard, once an accident is detected, the controller may be configured to take various actions, including one or more actions to preserve data indicative of the accident to assist with accident reconstruction. As an example, such data may indicate how the accident occurred, which driver or vehicle was at fault for the accident, the performance of one or more vehicles during the accident, or other information about the accident that may be useful to analyze.

As an example, the controller may be configured to buffer the radar data as it is received from the radar sensor and, once an accident is detected, the controller may be configured to store and preserve portions of the radar data received within a certain time (e.g., about 10 to 20 seconds or more) before the accident and a certain time (e.g., about 10 to 20 seconds or more) after the accident. Such data will be referred to hereafter as the "accident data." In some embodiments, the controller is configured to append or otherwise mark the accident data with metadata, such as a timestamp and geolocation data indicating approximately when the accident occurred and the location of the accident. The geolocation data may be determined from a location sensor, such as a global positioning system (GPS) sensor or other type of location sensor, on the primary vehicle.

The controller may be configured to preserve the accident data in various ways to ensure that it is not overwritten before the data can be further analyzed for accident reconstruction or other purposes as may be desired. As an example, the controller may move the accident data from a buffer to a safe area of memory that is not routinely overwritten or where overwrites and data stores are controlled such that the data is preserved for an extended period of time.

Note that accident data may include other types of data in addition to or in lieu of radar data. For example, the primary vehicle may have other types of sensors, such as a LiDAR sensor or a camera, configured to provide sensor data indicative of third-party vehicles, including the third-party vehicles involved in the accident. Similar to the radar data described above, such sensor data may be preserved as part of the accident data that is later used to reconstruct the accident or for other purposes in analyzing the accident. As described above for the radar sensor, the sensor data from another type of sensor received within a certain time window before, during, and/or after the accident may be stored and preserved for later analysis. In some embodiments, the controller determines to take steps for preserving such data as part of a set of accident data (which may include radar data, if desired) in response to a detection of the accident using the radar data, as described above. That is, detection of the accident using the radar data triggers various actions for preserving sensor data of the primary vehicle, and such sensor data may include data from any sensor of the primary vehicle, including the radar sensor, a LiDAR sensor, a camera, or any combination thereof.

After an accident has been detected, the controller may be configured to transmit the accident data to a remote location, such as a server, for various purposes, as will be described in more detail below. As an example, using the location of the accident indicated by the metadata, the server may be configured to identify a law enforcement agency responsible for the jurisdiction of the accident and send a notification of the accident to such law enforcement agency. In another example, the server may be configured to search for a party that may be interested in the accident data. As an example, using the time and location of the accident indicated by the metadata, the server may be configured to search various accessible information (e.g., a database of filed lawsuits or accident reports) to find a party that may be interested in the information. As an example, if the server is able to locate an accident report based on the time and location of the accident, the server may be able use the accident report to identify a party involved in the accident and notify the party of the existence of the accident data pertaining to the accident.

In another embodiment, the server may be configured to store the accident data of many accidents over time. If a user is interested in finding information about a particular accident, the user may search the records of the server using location and time of the accident as keys for finding the accident data pertaining to the accident of interest. Various other ways of using or making the accident data available for use are possible in other embodiments.

Note that using the detections of accidents based on radar data as triggers to store and preserve accident data helps to keep the amount of stored accident data over time more manageable relative to an embodiment that attempts to store and preserve all of the sensor data received from vehicle sensors. In this regard, by preserving sensor data in response to accident detections, the amount of data preserved can be significantly reduced. Further, using radar data, it is possible for the controller of the primary vehicle to detect accidents relatively accurately, thereby reducing many false accident detections that may otherwise occur. Specifically, using velocity and acceleration vectors and position determined from radar data, it is possible to more accurately predict when an accident is going to occur and has occurred relative to an embodiment that might rely on other types of sensors, such as cameras that provide essentially a two-dimensional (2D) view. In addition, radar is less impacted by weather and obstructions to visibility, such as fog or smoke, relative to other types of sensors. Also, the size of radar data that is useful in characterizing a scene can be much less than the amount of sensor data from other types of sensors, such as a camera that may produce a large amount of image data in a short amount of time.

Figure 5:
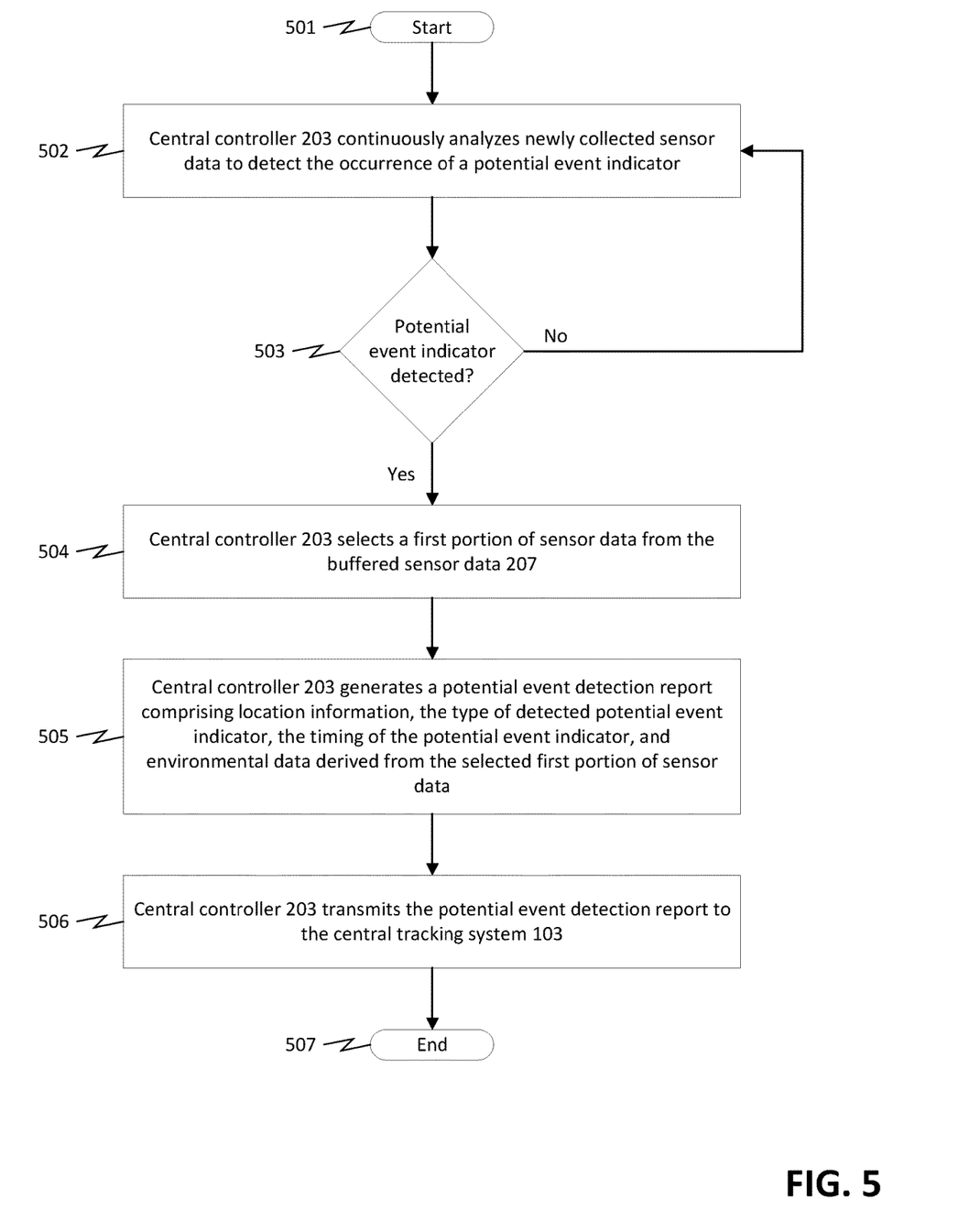
FIG. 5 is a flowchart illustrating the generation of a potential event detection report by a vehicle recording system, such as the vehicle recording system of FIG. 1.

FIG. 5 is a flowchart illustrating the generation of a potential event detection report by a vehicle recording system, such as the vehicle recording system of FIG. 1.

In addition, in some embodiments, various techniques may be used to selectively filter the accident data and discard at least some sets of accident data based on various factors. As an example, in one embodiment, the controller may be configured to estimate the severity of an accident based on the velocity and acceleration vectors determined from the radar data. In this regard, an accident for which the vehicles are traveling faster and for which there is greater deceleration at the time of the accident are likely to be more severe and, thus, likely to result in greater personal injury. If the controller determines that the severity of an accident is low (e.g., below a predefined threshold), then the controller may be configured to discard the accident data associated with such accident. Otherwise, the accident may be preserved, such as for example, transmitted to a server for further analysis or storage.

In some embodiments, the server that receives accident data may be configured to take various steps to assess whether to retain the accident data for an extended time. As an example, the server may be configured to assess the severity of the accident, using the techniques described above based on radar, and decide whether to discard or keep the accident data. In some cases, the server may be configured to use data from other systems about traffic occurring at the location of the accident to confirm whether an accident occurred or to assess whether the accident is of a sufficient severity to warrant retention of the accident data.

Figure 6:
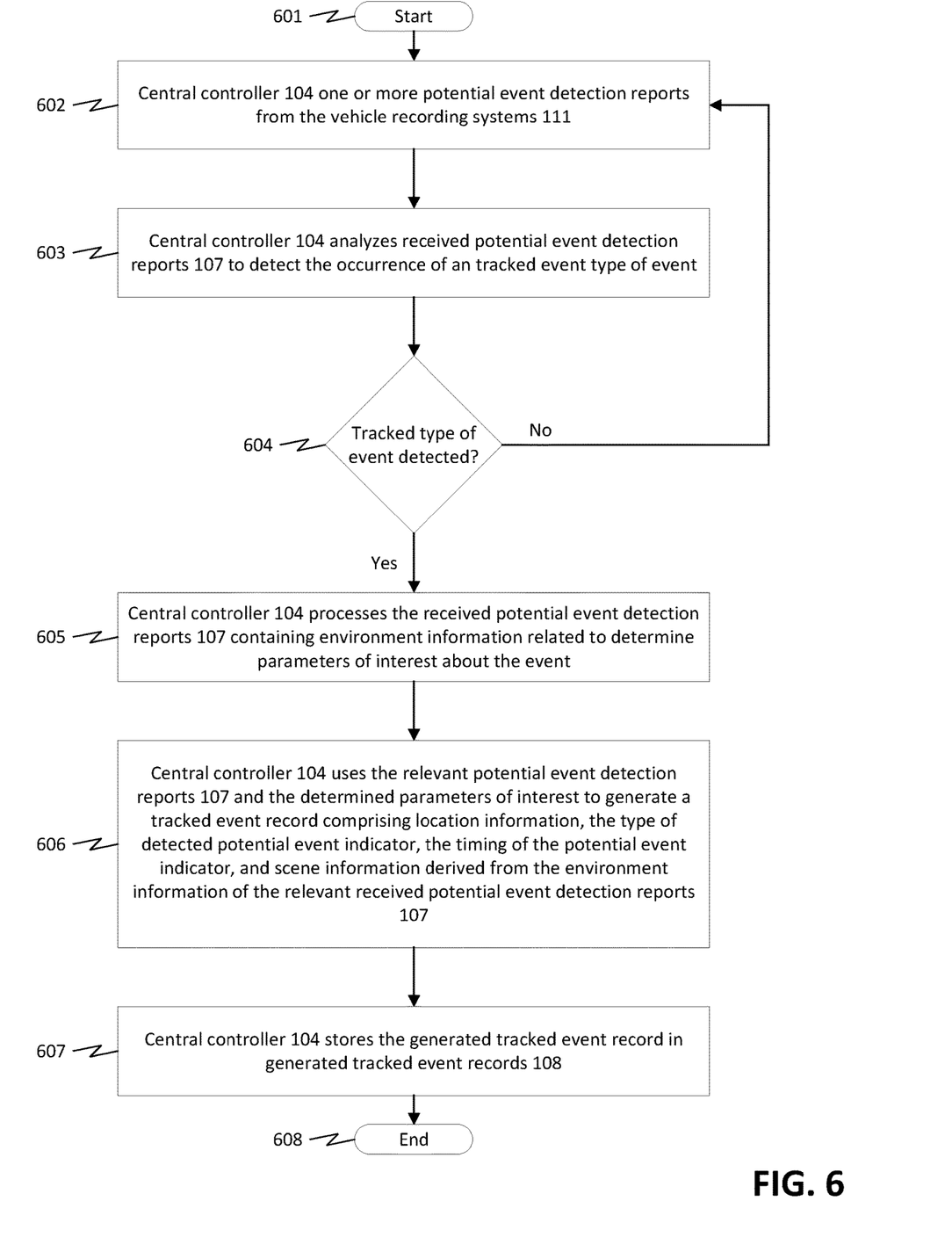
FIG. 6 is a flowchart illustrating the generation of a potential event detection report by a vehicle recording system, such as the vehicle recording system of FIG. 1.

FIG. 6 is a flowchart illustrating the generation of a potential event detection report by a vehicle recording system, such as the vehicle recording system of FIG. 1.

In this regard, radar data can be used to determine information about objects, such as third-party vehicles within a proximity of the primary vehicle. Specifically, in analyzing the radar data, it is possible for a controller to detect an object, such as a third-party vehicle, and determine the object's range, azimuth, and elevation from the radar sensor. The controller may also determine acceleration and velocity vectors of the object. Using such information, including in particular the velocity and acceleration vectors, it is possible for the controller to determine the trajectory or track of the object in three-dimensional (3D) space. For example, if an object is moving from one point (point A) to a second point (point B), its velocity and acceleration vectors may be determined based on the time taken by the object to move from point A to point B.

The radar sensor data collected from the accident may be useful in several other ways, such as for accident reconstruction, as mentioned previously, for fault determination, for insurance coverage for the incident, for future insurance determination and actuarial data, help with putting up safety traffic signs etc.

As an example, there are various traffic monitoring services, such as Google Maps, that track traffic. The server may be configured to contact another server associated with such service to receive information about traffic occurring in the area of the accident. For example, if the information indicates that significant traffic delays occur near the location of the accident shortly after the accident, then the server may confirm that an accident has occurred and use this information as a factor in deciding to retain the accident data. Also, the duration of the traffic delays may be indicator of accident severity. In this regard, longer delays that persist for a longer amount of time may indicate a more severe accident. Thus, if the duration and/or length of traffic delays exceeds a predefined threshold, the server may be configured to retain the accident data.

In another example, the server may contact another service to identify one or more vehicles approaching a detected accident. The server may then communicate with (e.g., tip and/or cue) such vehicle to request certain information. As an example, a vehicle approaching an accident may be requested to send camera images to the server, which may then analyze the images to assess accident severity. For example, the images may include flashing lights of emergency response vehicles, such as police vehicles, firetrucks, or ambulances. The server may detect such lights in the images and increase the estimated severity level of the accident or confirm the accident based on the detection of such lights. In some embodiments, the estimate severity may be increased if more lights are detected. Also, a damaged vehicle involved in the accident may be detected in the images, and the severity of the damage may be estimated and used to estimate the severity of the crash. Yet other techniques for using sensor data from other vehicles are possible in other embodiments.

For example, FIGS. 7A and 7B illustrate a traffic collision detected by a vehicle recording system, such as the vehicle recording system of FIG. 1. As shown in the figure, a vehicle 703 embodying a vehicle recoding system 112 is seen oriented in a particular direction for illustration purposes only. The vehicle 703 may be stationary or in motion along any direction, with at least one radar sensor present on the vehicle unit (not shown). The vehicle 703 may comprise several radar sensors. In addition, the vehicle unit may also house other types of sensors, such as cameras or LiDAR sensors (not shown). These sensors may be located at various parts of the vehicle 703 and may be operationally connected to the radar sensor. Multiple radar sensors may be located on various parts of the vehicle 703 in order to obtain a 360 degree view around the vehicle 703, such that some or all of the range of one radar sensor may overlap with some or all of the range of an adjacent radar sensor on the vehicle 703. Other types of views are possible in other embodiments. Other sensors may be located adjacent to a radar sensor or on the dash of the car or at another vantage point in order to capture an accident between third-party vehicles, as will be explained in more detail further. The sensors may be connected to a storage device (not shown), which may be a local or a cloud storage device.

Also shown in FIG. 7A are radar pulses 710 emanating from a radar sensor on the vehicle 703. Such a radar sensor may be configured to receive the reflected radar pulses from various objects within the proximity of the vehicle 703. The radar sensor may be configured to detect these objects such as vehicles (in motion or parked) or pedestrians around the vehicle 703, based on the reflected pulses. Upon capturing the reflected pulses, the radar sensor processes the pulse data to define the sensory data that may be used to determine information about third-party vehicles, such as orientation or path of the objects, velocities, distance travelled etc. relative to vehicle 703 or relative to another third-party vehicle. For example, if 2 radar sensors located on either side of vehicle 703 receive pulses indicating 2 separate objects are moving at a near constant speed on either side of the vehicle 703, it could be interpreted by the radar sensor that both adjacent lanes of the vehicle 703 are occupied by other vehicles. If the radar sensor detects that an object may be traveling towards the vehicle 703 without showing signs of slowing down, the radar sensor may initiate a warning sequence to the driver of the vehicle 703 to notify the driver of a possible collision from another object. If a collision occurs, the radar sensor may also initiate other steps such as contacting emergency services etc.

Broadly speaking, the controller may be configured to save the buffer data from the detection of an imminent collision. The controller may also save the data for a predetermined amount of time prior to the detection of an imminent collision, in order to capture the entire circumstances of an accident. For example, if the imminent collision between vehicles 705 and 707 was determine when the vehicles respectively occupied points 706A and 708A, the buffer of the sensors on board the vehicle 703 may hold data related to the vehicles 705 and 707 from 10 seconds prior to the vehicles occupying those positions 706A and 708A. So the data buffered from 10 seconds prior to the detection of imminent collision may be stored into the memory for accident reconstruction purposes at a later time.

In another embodiment, the radar sensor on the vehicle 703 may read from the received pulse data that 2 third-party vehicles may be heading towards one another. As shown in FIG. 7A, vehicles 705 and 707 may be identified by the radar sensor on vehicle 703 as traveling towards the same point in space 709. This would be flagged by the radar sensor as a possible collision between vehicles 705 and 707. Also shown is a position of vehicle 705, identified here as 706A and a position of vehicle 707 identified here as 708A. The radar sensor on vehicle 703 may determine that a vehicle 705 is traveling at a particular speed towards point 709. The radar sensor, may also determine that a straight line drawn from 706A to 709 intersects with a straight line drawn from 708A to 709. Assuming the vehicles 705 and 707 maintain the same speed, vehicle 707 may arrive at the point 709 at nearly the same time as vehicle 705. Based on the collected data, the radar sensor may determine that a collision is imminent at point 709.

As mentioned previously, the radar sensor may be operationally coupled to other sensors located at other places on the vehicle 703. The radar system continuously scans third-party vehicles and other objects within the proximity of vehicle 703, however, due to privacy laws, the radar system 702 is not configured to record or capture any information obtained during is configured to detect a possible collision, however, it is only configured to buffer this information in an open-loop memory system without recording any data related to the third-party vehicles or objects. The scanned radar data is only held in a buffer memory, which could be a FIFO circular buffer or another kind of buffer, without any scan data being recorded or stored. The other sensors present on the vehicle 703 are kept in a dormant state at all times. However, dormant may also mean that the cameras or LiDAR sensors may be held in a stand-by mode. The only time that the other sensors are activated is when the radar sensor or sensors detect an accident has occurred, which will be described in further detail below.

FIG. 7B shows a scene similar to FIG. 7A. However, as can also be seen in FIG. 7B, at the new positions 706B and 708B, the vehicles speed has come to 0 after a rapid deceleration of both vehicles. The radar data collected at this point of convergence and from 2 separate vehicles, accompanied by the rapid deceleration of the vehicles, may indicate that a collision has occurred at point 709.

At this point, the radar system 702 may take several steps. In some embodiments, some of the steps may be to trigger other sensors in the vehicle 703 to begin recording the incident, which until this point is only held in a buffer region and is cleared out as and when new data comes in. In some embodiments, a FIFO circular buffer may be used. Other types of buffers may be used in other embodiments. When the radar system 702 determines that a collision between 2 third-party vehicles has occurred within the proximity of the vehicle 703, it may trigger a camera sensor located on the vehicle 703, to begin recording the accident, by providing the location of the accident to the camera sensor, so that the camera sensor may accurately orient itself. For example, the camera sensor or dash camera may be mounted on a 360 degree swivel, which may be used for orientation purposes. The radar sensor may also trigger a LiDAR sensor to capture any relevant license plate information for incident reconstruction, which will be described in further detail below.

For example, on the vehicle is configured to sense incidents unrelated to the vehicle 703, as can be seen in FIG. 7A. Two other vehicles 705 and 707 are detected by at least one radar sensor on vehicle 703. The vehicles 705 and 707 can be seen to have crashed into one another. The individual track files of the vehicles 705 and 707 may indicate that they have a single point of convergence 709. The controller on vehicle 703 may note the single point on convergence 709 of two different track files of vehicles 705 and 707, and detect an occurrence of an accident between the vehicles 705 and 707 based on such convergence 709. The controller on the vehicle 703 may then flag this data as an incident and append the latitudinal and longitudinal data for the location of point 709 and the time at which the accident occurs. The controller may also be configured to send a trigger to one or more other sensors on vehicle 703. This trigger may initiate a recording of the incident via an on-board camera which is oriented in the direction of the incident. Other sensors may be triggered at the same time to detect or capture the surrounding environment around the scene of the incident, such as to confirm if emergency services have arrived at the scene. The collected radar data, as well as the recorded camera data, may be sent to a storage 710, via the internet or other forms of wireless transmission 712. The storage 710 may be configured to share the collected radar and camera data with interested parties such as law enforcement, insurance companies etc.

Note that the foregoing has been generally described in the context of detecting accidents between vehicles. Note that the same techniques may be used to detect accidents between any types of objects that can be tracked, such as pedestrians, bicycles, etc.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The devices, modules, and other functional units described in this disclosure can be implemented by hardware, or software, or a combination of hardware and software. In some embodiments, functions described as being implemented in hardware may instead be implemented in software or a combination of hardware and software. Likewise, in some embodiments, functions described as being implemented in software may instead be implemented in hardware or a combination of hardware and software. If something is implemented by software, it may be stored in a non-transitory computer-readable media, like the computer-readable media described above. Such software, when executed by a processor, may perform the function of the device, module or other functional unit the software is implementing. The above described devices, modules, and other functions units may also be combined or may be further divided into a plurality of sub-units.

In some places reference is made to standards, including standard methods of performing some task. These standards are revised from time to time, and, unless explicitly stated otherwise, reference to standards in this disclosure refer to the most recent published standard as of the time of filing.

Spatially relative terms, such as "under", "below", "lower", "over", "upper" and the like, may be used herein for ease of description to describe one element or feature's relationship to another when the apparatus is right side up.

When a feature is referred to as being "on" another feature, the feature may be directly on the other feature with no intervening features present or it may be indirectly on the other feature with intervening features being present. In contrast, when a feature is referred to as being "directly on" another feature, the feature is directly on the other feature with no intervening features present. It will also be understood that, when a feature is referred to as being "connected", "attached" or "coupled" to another feature, the feature may be directly connected, attached or coupled to the other feature with no intervening features present or it may be indirectly connected, attached or coupled to the other feature with intervening features being present. In contrast, when a feature is referred to as being "directly connected", "directly attached" or "directly coupled" to another feature, the feature is directly connected, directly attached, or directly coupled to the other feature with not intervening features present.

The terms "about" and "approximately" shall generally mean an acceptable degree of error or variation for the quantity measured given the nature or precision of the measurements. Typical, exemplary degrees of error or variation are within 20%, preferably within 10%, more preferably within 5%, and still more preferably within 1% of a given value or range of values. Numerical quantities given in this description are approximate unless stated otherwise, meaning that the term "about" or "approximately" can be inferred when not expressly stated.

Ordinal numbers or terms such as "first" and "second" are used only to differentiate an entity or operation from another entity or operation, and do not require or imply any actual relationship or sequence between these entities or operations. Thus, a first feature or element could be termed a second feature or element, and similarly, a second feature or element could be termed a first feature or element without departing from the teachings of the present disclosure. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the terms "or" and "at least one of" encompasses all possible combinations, except where infeasible. For example, if it is stated that a component may include "A or B," then, unless specifically stated otherwise or infeasible, the component may include "A," "B," or "A and B." As a second example, if it is stated that a component includes "at least one of A, B, or C," then, unless specifically stated otherwise or infeasible, the component may include "A," "B," "C," "A and B," "A and C," "B and C," or "A, B, and C." This same construction applies to longer lists (e.g., "may include A, B, C, or D").

As used herein, the singular forms "a", "an," and "the" are intended to include the plural forms as well, unless the context clearly indicates otherwise.

Any statements in this disclosure criticizing or disparaging aspects of the prior art are not intended to indicate that what is claimed excludes any of those criticized or disparaged aspects of the prior art.

Any given element or step of the embodiments disclosed above may be embodied in a single element or step or may be embodied in multiple elements or steps. Moreover, any given element or step of the embodiments disclosed above may be combined and embodied in single element or step or may be combined and embodied in multiple elements or steps.

The sequence of steps shown in the various figures are only for illustrative purposes and do not necessarily indicate that embodiments of the present disclosure are limited to any particular sequence of steps. As such, steps performed by various embodiments of the present disclosure can be performed in a different order while implementing the same method.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

Now, therefore, the following is claimed:

1. An event recording system, comprising:
   a sensor suite configured to collect sensor data about a local environment around a first vehicle, wherein the sensor suite comprises one or more sensors that are each attached to the first vehicle;
   memory configured to buffer collected sensor data for a first amount of time after being collected by the sensor suite; and
   one or more processors configured to:
      analyze the sensor data collected by the sensor suite to detect at least one potential event indicator, wherein the at least one potential event indicator is associated with a first type of event and with a first timestamp; and
      responsive to detecting the at least one potential event indicator:
         select, from the collected sensor data buffered in the memory, a first portion of sensor data, wherein the first portion of sensor data comprises sensor data associated with timestamps in a range beginning a second amount of time before the first timestamp and ending a third amount of time after the first timestamp;
         generate a potential event detection report, wherein the potential event detection report comprises location information indicating a geographic location of the first vehicle, data identifying the at least one potential event indicator, timing information indicating a time of occurrence of the at least one potential event indicator, and environment information comprising data from the first portion of sensor data; and
      transmit the potential event detection report to an event tracking system.

2. The event recording system of claim 1, wherein the one or more processors are further configured to analyze the sensor data collected by the sensor suite to detect a plurality of nearby objects and to determine tracking data for the detected plurality of nearby objects, wherein the detected tracing data comprises a plurality of tracking traces that each indicate, for an associated one of the plurality of nearby objects, a position, velocity, and acceleration of the respective nearby object.

3. The event recording system of claim 2, wherein:
   the at least one potential event indicator comprises a first tracking trace associated with a first nearby object and a second tracking trace associated with a second nearby object, wherein:
      the position indicated by the first tracking trace is within a first distance of the position indicated by the second tracking trace; and
      the position indicated by the first tracking trace is approaching the position indicated by the second tracking with at least a first velocity;
   the first type of event is a traffic collision; and the environment information comprises the first tracking trace and the second tracking trace.

4. The event recording system of claim 2, wherein:
the sensor suite comprises at least a first multiple-input and multiple-output (MIMO) radar sensor and at least a first image sensor;
the sensor data collected by the sensor suite comprises a first set of sensor data collected by the first MIMO radar sensor and a second set of sensor data collected by the first image sensor; and
analyzing the sensor data to determine tracking data for the detected plurality of nearby objects comprises:
generating a first set of tracking data using the first set of sensor data, the first set of tracking data comprising a first set of tracking traces that each indicate, for an associated one of the plurality of nearby objects, a position, velocity, and acceleration of the respective nearby object;
generating a second set of tracking data using the second set of sensor data, the second set of tracking data comprising a second set of tracking traces that each indicate, for an associated one of the plurality of nearby objects, a position, velocity, and acceleration of the respective nearby object; and
fusing the first set of tracking data and the second set of tracking data.

5. The event recording system of claim 2, wherein:
the sensor suite comprises at least a first multiple-input and multiple-output (MIMO) radar sensor and at least a first image sensor;
the sensor data collected by the sensor suite comprises a first set of sensor data collected by the first MIMO radar sensor and a second set of sensor data collected by the first image sensor; and
analyzing the sensor data to determine tracking data for the detected plurality of nearby objects comprises generating a first set of tracking data by jointly using the first set of sensor data and the second set of sensor data, the first set of tracking data comprising a first set of tracking traces that each indicate, for an associated one of the plurality of nearby objects, a position, velocity, and acceleration of the respective nearby object.

6. The event recording system of claim 1, wherein the sensor suite comprises:
a first multiple-input and multiple-output (MIMO) radar sensor;
a first lidar sensor;
a first image sensor; and
a first ultrasonic sensor.

7. A method for recording events, comprising:
collecting sensor data about a local environment around a first vehicle, wherein the sensor data is collected by a sensor suite comprised of one or more sensors that are each attached to the first vehicle;
buffering collected sensor data for a first amount of time after being collected by the sensor suite;
analyzing the sensor data collected by the sensor suite to detect at least one potential event indicator, wherein the at least one potential event indicator is associated with a first type of event and with a first timestamp; and
responsive to detecting the at least one potential event indicator:
selecting, from the buffered collected sensor data, a first portion of sensor data, wherein the first portion of sensor data comprises sensor data associated with timestamps in a range beginning a second amount of time before the first timestamp and ending a third amount of time after the first timestamp;
generating a potential event detection report, wherein the potential event detection report comprises location information indicating a geographic location of the first vehicle, data identifying the at least one potential event indicator, timing information indicating a time of occurrence of the at least one potential event indicator, and environment information comprising data from the first portion of sensor data; and
transmitting the potential event detection report to an event tracking system.

8. The method of claim 7, further comprising analyzing the sensor data collected by the sensor suite to detect a plurality of nearby objects and to determine tracking data for the detected plurality of nearby objects, wherein the detected tracing data comprises a plurality of tracking traces that each indicate, for an associated one of the plurality of nearby objects, a position, velocity, and acceleration of the respective nearby object.

9. The method of claim 8, wherein:
the at least one potential event indicator comprises a first tracking trace associated with a first nearby object and a second tracking trace associated with a second nearby object, wherein:
the position indicated by the first tracking trace is within a first distance of the position indicated by the second tracking trace; and
the position indicated by the first tracking trace is approaching the position indicated by the second tracking with at least a first velocity;
the first type of event is a traffic collision; and
the environment information comprises the first tracking trace and the second tracking trace.

10. The method of claim 8, wherein:
the sensor suite comprises at least a first multiple-input and multiple-output (MIMO) radar sensor and at least a first image sensor;
the sensor data collected by the sensor suite comprises a first set of sensor data collected by the first MIMO radar sensor and a second set of sensor data collected by the first image sensor; and
analyzing the sensor data to determine tracking data for the detected plurality of nearby objects comprises:
generating a first set of tracking data using the first set of sensor data, the first set of tracking data comprising a first set of tracking traces that each indicate, for an associated one of the plurality of nearby objects, a position, velocity, and acceleration of the respective nearby object;
generating a second set of tracking data using the second set of sensor data, the second set of tracking data comprising a second set of tracking traces that each indicate, for an associated one of the plurality of nearby objects, a position, velocity, and acceleration of the respective nearby object; and
fusing the first set of tracking data and the second set of tracking data.

11. The method of claim 8, wherein:
the sensor suite comprises at least a first multiple-input and multiple-output (MIMO) radar sensor and at least a first image sensor;
the sensor data collected by the sensor suite comprises a first set of sensor data collected by the first MIMO radar sensor and a second set of sensor data collected by the first image sensor; and analyzing the sensor data to determine tracking data for the detected plurality of nearby objects comprises generating a first set of tracking data by jointly using the first set of sensor data and the second set of sensor data, the first set of tracking data comprising a first set of tracking traces that each indicate, for an associated one of the plurality of nearby objects, a position, velocity, and acceleration of the respective nearby object.

12. A non-transitory computer readable medium comprising instructions that, when executed by one or more processors, cause the one or more processors to record nearby events by:
   collecting sensor data about a local environment around a first vehicle, wherein the sensor data is collected by a sensor suite comprised of one or more sensors that are each attached to the first vehicle;
   buffering collected sensor data for a first amount of time after being collected by the sensor suite;
   analyzing the sensor data collected by the sensor suite to detect at least one potential event indicator, wherein the at least one potential event indicator is associated with a first type of event and with a first timestamp; and
   responsive to detecting the at least one potential event indicator:
      selecting, from the buffered collected sensor data, a first portion of sensor data, wherein the first portion of sensor data comprises sensor data associated with timestamps in a range beginning a second amount of time before the first timestamp and ending a third amount of time after the first timestamp;
      generating a potential event detection report, wherein the potential event detection report comprises location information indicating a geographic location of the first vehicle, data identifying the at least one potential event indicator, timing information indicating a time of occurrence of the at least one potential event indicator, and environment information comprising data from the first portion of sensor data; and
      transmitting the potential event detection report to an event tracking system.

13. The non-transitory computer readable medium of claim 12, wherein the instructions further cause the processors to record nearby events by further comprising analyzing the sensor data collected by the sensor suite to detect a plurality of nearby objects and to determine tracking data for the detected plurality of nearby objects, wherein the detected tracing data comprises a plurality of tracking traces that each indicate, for an associated one of the plurality of nearby objects, a position, velocity, and acceleration of the respective nearby object.

14. The non-transitory computer readable medium of claim 13, wherein:
   the at least one potential event indicator comprises a first tracking trace associated with a first nearby object and a second tracking trace associated with a second nearby object, wherein:
      the position indicated by the first tracking trace is within a first distance of the position indicated by the second tracking trace; and
      the position indicated by the first tracking trace is approaching the position indicated by the second tracking with at least a first velocity;
   the first type of event is a traffic collision; and
   the environment information comprises the first tracking trace and the second tracking trace.

15. The non-transitory computer readable medium of claim 13, wherein:
   the sensor suite comprises at least a first multiple-input and multiple-output (MIMO) radar sensor and at least a first image sensor;
   the sensor data collected by the sensor suite comprises a first set of sensor data collected by the first MIMO radar sensor and a second set of sensor data collected by the first image sensor; and
   analyzing the sensor data to determine tracking data for the detected plurality of nearby objects comprises:
      generating a first set of tracking data using the first set of sensor data, the first set of tracking data comprising a first set of tracking traces that each indicate, for an associated one of the plurality of nearby objects, a position, velocity, and acceleration of the respective nearby object;
      generating a second set of tracking data using the second set of sensor data, the second set of tracking data comprising a second set of tracking traces that each indicate, for an associated one of the plurality of nearby objects, a position, velocity, and acceleration of the respective nearby object; and
      fusing the first set of tracking data and the second set of tracking data.

16. The non-transitory computer readable medium of claim 13, wherein:
   the sensor suite comprises at least a first multiple-input and multiple-output (MIMO) radar sensor and at least a first image sensor;
   the sensor data collected by the sensor suite comprises a first set of sensor data collected by the first MIMO radar sensor and a second set of sensor data collected by the first image sensor; and
   analyzing the sensor data to determine tracking data for the detected plurality of nearby objects comprises generating a first set of tracking data by jointly using the first set of sensor data and the second set of sensor data, the first set of tracking data comprising a first set of tracking traces that each indicate, for an associated one of the plurality of nearby objects, a position, velocity, and acceleration of the respective nearby object.

17. An event tracking system, comprising:
   a networking unit configured to receive a plurality of potential event detection reports from a plurality of event recording systems, wherein each of the plurality of potential event detection reports comprises location information indicating a geographic location of a first vehicle, data identifying at least one potential event indicator, timing information indicating a time of occurrence of the at least one potential event indicator, and environment information comprising data from a first portion of sensor data, wherein:
      the detected potential event indicator is detected by analyzing the sensor data collected by the sensor suite; and
      the detected potential event indicator is associated with a first type of event and with a first timestamp;
      the first portion of sensor data is selected from a sensor suite configured to collect sensor data about a local environment around the first vehicle; and
      the sensor suite comprises one or more sensors that are each attached to the first vehicle; and
      the first portion of sensor data comprises sensor data associated with timestamps in a range beginning a second amount of time before the first timestamp and ending a third amount of time after the first timestamp;

memory configured to store at least a portion of the received plurality of potential event detection reports; and one or more processors configured to:
analyze the received plurality of potential event detection reports to detect an occurrence of at least one tracked event; and responsive to detecting the occurrence of the at least one tracked event, generating an event record for the at least one tracked event, wherein:

the tracked event record comprises location information indicating a geographic location of the at least one tracked event, data identifying a type of at least one tracked event, and scene information comprising data obtained from the environment information of a first set of the received plurality of potential event reports, wherein the environment information of each of the first set of potential event detection reports comprises data derived from sensor data collected in a local environment containing the tracked event.

* * * * *